United States Patent Office 3,488,196
Patented Jan. 6, 1970

3,488,196
METHOD OF RAISING SILKWORMS ON ARTIFICIAL FEED
Masazumi Niimura, 8–25, 6-chome, Zaimokuza, Kamakura-shi, Kanagawa-ken, Japan; Jiro Kirimura, 10–3, 2-chome, Kakinokizaka, Meguro-ku, Tokyo, Japan; and Noboru Katsuya, 711, Nakamaruko, Kawasaki-shi, Kanagawa-ken, Japan
No Drawing. Filed Mar. 23, 1966, Ser. No. 536,610
Claims priority, application Japan, Apr. 2, 1965, 40/19,051, 40/19,052
Int. Cl. A23k *1/18;* A01k *67/04*
U.S. Cl. 99—2                                    4 Claims

ABSTRACT OF THE DISCLOSURE

Silkworms fed mulberry leaf substance together with 20–60% protein to second instar may be brought to maturity thereafter on a feed free from mulberry leaves and containing 20 to 60 percent protein on a dry basis. The cocoons spun are at least equal in weight to those produced on a straight mulberry leaf feed.

---

This invention relates to silkworm feed and to a method of raising silkworms, and more particularly it relates to an artificial feed for silkworms.

The silkworm was considered for a long time a monophagous insect eating only mulberry leaves. The supply of mulberry leaves, however, varies with the weather and much labor is required for collecting the leaves.

Therefore, it has been proposed heretofore to use artificial feed for raising silkworms. However, the known types of artificial feed are inferior to natural mulberry leaves in the growth rate of the silkworm larvae and the weight of the cocoons produced. The known types of artificial feed which produces good results in raising larvae and producing cocoons contain high percentages of mulberry leaf powder or derivatives of mulberry leaves, such as mulberry leaf extracts, citral, linalool, linalyl acetate, terpinyl acetate, flavonoids, silica, etc., and can be employed experimentally, but not for practical use.

We have found that the earlier attempts at raising silkworm on artificial feed failed because the same feed was given to the larvae throughout the several stages of development. Silkworms were found to be polyphagous and to eat food which does not contain mulberry leaf or its derivatives after the second instar.

Newly hatched larvae are monophagous and are attracted by the odor and taste of mulberry leaves. They do not eat artificial feed not containing mulberry leaf or its derivatives.

We have succeeded in raising silkworm to 2nd instar on natural mulberry leaves or artificial feed which contains mulberry leaf or its derivatives, and after 2nd instar on artificial feed which contains 20–60 percent by weight on a dry basis of protein and need not contain mulberry leaf or its derivatives.

It was believed heretofore that more than 20% protein in the artificial feed has a detrimental effect on the growth of the larvae and on cocoon production. [Bulletin of Sericultural Station vol. 18, No. 1, pages 1 to 29 (1962).] This has been found by us not to be correct. 10–15 percent Protein in artificial feed is not sufficient, and silkworms require 20–60 percent, preferably 30–40% protein in artificial feed on a dry basis. When the artificial feed contains 20–60 percent protein, the growth of the larvae is accelerated, their ultimate weight and that of the useful cocoon layer are increased and the percentage of larvae spinning cocoons is higher. The cocoons obtained by the use of artificial feed are very white because the feed does not contain the pigment precursors present in mulberry leaves.

The artificial feed of this invention which is given to larvae after 2nd instar contains 20–60 percent soybean protein, alfalfa protein, wheat protein, corn protein, milk protein, egg protein and need not contain mulberry leaf or its derivatives. The water content of this feed is 60–95% by weight.

Materials which contain protein such as soybean meal may be employed as a protein source in the artificial silkworm feed of the invention.

It is desirable to add known useful ingredients of artificial silkworm feed to the protein base. They include carbohydrates such as saccharides, sterols such as $\beta$-sitosterol, cholesterol, or ergosterol, organic acids such as citric acid, propionic acid, inorganic salts such as $K_2HPO_4$, $MgSO_4$, $CaCO_3$, vitamins such as vitamin $B_1$, vitamin $B_2$, vitamin $B_6$, vitamin C, and gelling agents such as agar, starch.

EXAMPLE 1

Two feeds were mixed to the following compositions (percent by weight on a dry basis):

|  | Feed A | Feed B |
|---|---|---|
| Mulberry leaf powder | 10 | 0 |
| Defatted soybean meal | 65 | 75 |
| Potato starch | 7.5 | 9 |
| Sugar | 7.5 | 9 |
| Citric acid | 1 | 0 |
| Agar | 5 | 5 |
| Propionic acid | 1.5 | 1.7 |
| Vitamin B group | 0.1 | 0 |
| Vitamin C | 2 | 0 |
| Soybean sterol | 0.4 | 0.3 |
| Total Protein content | 32.5 | 37.5 |

A dough was made from each feed with three weights of water and was heated with steam for 20–45 minutes. The pieces of feed were cut to convenient size and shape.

Two groups of newly hatched silkworm larvae were raised to third instar on mulberry leaves, and a third group on feed A which contains 10% mulberry leaf powder. The larvae of fourth instar in the second and third group were raised on feed B which does not contain mulberry leaf or its derivatives at a temperature of 25–29° C. and at 60–90% relative humidity. The first group continued on mulberry leaves.

Two hundred silkworms were in each group.

The growth rate of the larvae and the quality of the cocoons produced by the three groups are shown in Table 1.

TABLE 1

|  | Raised on mulberry leaves only | Raised on mulberry leaves to 3d instar and on feed B from 4th to 5th instar | Raised on feed A to 3rd instar and on from B from 4th to 5th instar |
|---|---|---|---|
| Average weight of larvae in 3rd instar (mg.) | 120.5 | 120.5 | 128.0 |
| Average weight of larvae in 4th instar (mg.) | 658 | 685 | 692 |
| Average weight of grown-up silkworm (g.) | 4.99 | 5.60 | 5.85 |
| Percentage of larvae spinning cocoons | 97.0 | 78.5 | 97.5 |
| Surviving pupae (percent) | 97.0 | 98.5 | 97.5 |
| Average weight of cocoon (g.) | 1.95 | 2.31 | 2.49 |
| Average weight of cocoon layer (mg.) | 403 | 481 | 50 6 |

EXAMPLE 2

Five batches of artificial feed were prepared and had the following compositions:

|  | No. 1 | No. 2 | No. 3 | No. 4 | No. 5 |
|---|---|---|---|---|---|
| Purified milk casein | 20 | 30 | 40 | 50 | 60 |
| Sugar | 30 | 25 | 20 | 15 | 10 |
| Potato starch | 30 | 25 | 20 | 15 | 10 |
| Vitamin C | 2 | 2 | 2 | 2 | 2 |
| Cholesterol | 0.4 | 0.4 | 0.4 | 0.4 | 0.4 |
| Propionic acid | 1.5 | 1.5 | 1.5 | 1.5 | 1.5 |
| Vitamin B group | 0.1 | 0.1 | 0.1 | 0.1 | 0.1 |
| Citric acid | 1.0 | 1.0 | 1.0 | 1.0 | 1.0 |
| Mixed inorganic salts | 4.0 | 4.0 | 4.0 | 4.0 | 4.0 |
| Agar | 11 | 11 | 11 | 11 | 11 |

Each batch of feed was kneaded with 3 weights of water and then heated with steam for 20–45 minutes. The pieces of feed so obtained were cut to convenient size and shape.

Five groups of newly hatched silkworms were raised to second instar on feed A of Example 1 and the larvae were fed from third instar the above batches of feed which respectively contain protein from milk casein in amounts of 20%, 30%, 40% 50% and 60%.

Forty silkworms were tested in each group, and environmental conditions were the same as in Example 1.

The results obtained are shown in Table 2.

TABLE 2

|  | No. 1 | No. 2 | No. 3 | No. 4 | No. 5 |
|---|---|---|---|---|---|
| Average weight of larvae in 2nd instar (mg.) | 31.0 | 31.0 | 31.0 | 31.0 | 31.0 |
| Average weight of larvae in 3rd instar (mg.) | 125 | 125 | 129 | 122 | 117 |
| Average weight of larvae in 4th instar (mg.) | 725 | 732 | 731 | 691 | 620 |
| Average weight of grown-up silkworm (g.) | 3.95 | 4.05 | 4.22 | 4.02 | 3.77 |
| Percentage of larvae spinning cocoons | 81 | 89 | 88 | 91 | 75 |
| Average weight of cocoon (g.) | 1.82 | 1.99 | 2.19 | 1.44 | 1.21 |
| Average weight of cocoon layer (mg.) | 327 | 418 | 469 | 332 | 231 |

EXAMPLE 3

Feeds D, E were mixed to the following compositions:

|  | Feed D | Feed E |
|---|---|---|
| Mulberry leaf powder | 10.0 | 0 |
| Defatted soybean meal | 55 | 65 |
| Potato starch | 10 | 10 |
| Sugar | 10 | 10 |
| Agar | 10 | 10 |
| Cholesterol | 0.3 | 0.3 |
| Vitamin C | 2 | 2 |
| Vitamin B group | 0.1 | 0.1 |
| Citric acid | 1 | 1 |
| Propionic acid | 1.6 | 1.6 |

Each feed composite was kneaded with 3 weights of water and the dough obtained was heated with steam for 20–45 minutes and cut into pieces of convenient size and shape.

Two groups of forty newly hatched silkworms were raised to third instar respectively on mulberry leaves only, and on feed D and thereafter on feed E.

The enviromental conditions were the same as in Example 1.

The results obtained are shown in Table 3.

TABLE 3

|  | Raised on mulberry leaves | Raised on feed D and on feed E |
|---|---|---|
| Average weight (mg.) of molting larvae in— | | |
| 1st instar | 6.2 | 5.7 |
| 2nd instar | 27.8 | 28.0 |
| 3rd instar | 128.7 | 127.8 |
| 4th instar | 686 | 730 |
| Average weight of grown-up larvae (g.) | 4.81 | 5.85 |
| Average weight of cocoon (g.) | 1.96 | 2.41 |
| Average weight of cocoon layer (mg.) | 410 | 510 |
| Percentage of dead larvae in all stages | 25 | 0 |

EXAMPLE 4

Two feed compositions were made up as follows:

|  | Feed F | Feed G |
|---|---|---|
| Mulberry leaf powder | 10 | 0 |
| Defatted soybean meal | 54 | 65 |
| Potato starch | 10 | 10 |
| Sugar | 10 | 10 |
| Agar | 10 | 10 |
| Soybean sterol | 0.3 | 0.3 |
| Vitamin C | 3 | 2 |
| Vitamin B group | 0.2 | 0.1 |
| Citric acid | 0.99 | 0.99 |
| Propionic acid | 1.5 | 1.6 |
| Chloramphenicol | 0.01 | 0.01 |

Each feed was kneaded with 3 weights of water, heated with steam for 20–45 minutes, and the pieces were cut to convenient size and shape.

Two groups of 200 newly hatched silkworms were raised respectively on mulberry leaves and under aseptic conditions to fourth instar on feed F which contains 10 percent by weight of mulberry leaf powder and from fifth instar without asepsis on feed G. The temperature was 23–28° C. and the relative humidity 50–70 percent.

The results obtained are shown in Table 4.

TABLE 4

|  | Raised on mulberry leaves only | Raised on feed F to 4th instar and on feed G to 5th instar |
|---|---|---|
| Average weight of larvae in 5th instar (mg.) | 632 | 650 |
| Average weight of grown-up silkworm (g.) | 4.5 | 6.5 |
| Average weight of cocoon (g.) | 1.8 | 2.3 |
| Average weight of cocoon layer (mg.) | 4.65 | 4.53 |

It is evident from the Examples that silkworms who are fed a high-protein diet grow more and produce heavier and more useful cocoons than those who are raised on mulberry leaves only. The high-protein diet must be supplemented by mulberry leaf substance at least up to second instar. The best results are obtained when the artificial feed contains 30 to 40 percent protein by weight on a dry basis.

What is claimed is:
1. A method of raising silkworms which comprises:
    (a) feeding said silkworms from substantially the newly hatched stage to maturity a feed containing 20 to 60 percent protein and necessary amounts of carbohydrate, sterol, organic acid, inorganic salt, vitamin, gelling agent, and water;
    (b) said feed containing a member of the group consisting of mulberry leaf and mulberry leaf powder up to and including 2nd instar; and
    (c) said feed being free from members of said group after the 4th instar.
2. A method as set forth in claim 1, wherein said feed contains said member up to and including 3rd instar.
3. A method as set forth in claim 1, wherein said feed is free from members of said groups after 3rd instar.
4. A method as set forth in claim 1, wherein the protein content of said feed is 30% to 40% by weight on a dry basis.

References Cited

Sericulture Experiment Station Bulletin (Tokyo), vol. 16 (#5), January 1961, pp. 311–348.

Fukuda, T. et al., "Synthetic Diet for Silkworm Raising," Nature, Oct. 6, 1962, vol. 96, pp. 53–54.

Ito, T., "An Artificial Diet for the Silkworm, Bombyx Mori, and the Effect of Soybean Oil on Its Growth," Intenational Kongress Für Entomologie Band III (1969), Pavia, Italy.

A. LOUIS MONACELL, Primary Examiner

WILLIAM C. LAWTON, Assistant Examiner

U.S. Cl. X.R.

119—6